(12) United States Patent
Chen et al.

(10) Patent No.: US 10,788,930 B2
(45) Date of Patent: Sep. 29, 2020

(54) TOUCH-CONTROL PANEL, A MANUFACTURING METHOD THEREOF, AND A DISPLAY DEVICE

(71) Applicant: YUNGU (GU'AN) TECHNOLOGY CO., LTD., Langfang (CN)

(72) Inventors: Long Chen, Langfang (CN); Guizhou Qiao, Langfang (CN); Xiuyu Zhang, Langfang (CN)

( * ) Notice: Subject to any disclaimer, the term of this patent is extended or adjusted under 35 U.S.C. 154(b) by 0 days.

(21) Appl. No.: 16/718,220

(22) Filed: Dec. 18, 2019

(65) Prior Publication Data

US 2020/0125209 A1 Apr. 23, 2020

Related U.S. Application Data

(63) Continuation of application No. PCT/CN2018/118493, filed on Nov. 30, 2018.

(30) Foreign Application Priority Data

Jun. 30, 2018 (CN) .......................... 2018 1 0703674

(51) Int. Cl.
*G06F 3/041* (2006.01)
*G06F 3/047* (2006.01)

(52) U.S. Cl.
CPC ............ *G06F 3/0416* (2013.01); *G06F 3/047* (2013.01); *G06F 3/0412* (2013.01); *G06F 2203/04102* (2013.01); *G06F 2203/04103* (2013.01)

(58) Field of Classification Search
CPC .................................................... G06F 3/0416
See application file for complete search history.

(56) References Cited

U.S. PATENT DOCUMENTS

2015/0348675 A1 12/2015 Qu et al.
2017/0115787 A1 4/2017 Liu et al.

FOREIGN PATENT DOCUMENTS

CN 101493737 A 7/2009
CN 103996457 A 8/2014
(Continued)

OTHER PUBLICATIONS

Second Office Action of Chinese Patent Application No. 201810703674.6 dated May 13, 2020.
(Continued)

*Primary Examiner* — Gustavo Polo
(74) *Attorney, Agent, or Firm* — Kilpatrick Townsend & Stockton LLP (57) ABSTRACT

The present application discloses a touch-control panel, a manufacturing method thereof, and a display device. The touch-control panel comprises a flexible substrate, a touch-control electrode layer and a conductive layer, wherein the touch-control electrode layer comprises a nanometal pattern and a wiring pattern contacting with each other to establish an electric connection therebetween, and the conductive layer at least partially covers a contact region of the wiring pattern in contact with the nanometal pattern. The method for manufacturing a touch-control panel comprises: providing a flexible substrate; forming a touch-control electrode layer; and forming a conductive layer; wherein, the touch-control electrode layer comprises a nanometal pattern and a wiring pattern contacting with each other to establish an electric connection, and the touch-control electrode layer at least partially covers a contact region of the wiring pattern in contact with the nanometal pattern.

19 Claims, 6 Drawing Sheets

(56) References Cited

FOREIGN PATENT DOCUMENTS

| CN | 105426025 U | 3/2016 |
| CN | 205899520 U | 1/2017 |
| CN | 106927693 A | 7/2017 |
| CN | 108089755 A | 5/2018 |
| CN | 207302002 U | 5/2018 |
| CN | 108845704 A | 11/2018 |

OTHER PUBLICATIONS

Written Opinion for application No. PCT/CN2018/118493.
First Office Action of Chinese Application No. 201810703674.6.

TOUCH-CONTROL PANEL, A MANUFACTURING METHOD THEREOF, AND A DISPLAY DEVICE

CROSS-REFERENCES TO RELATED APPLICATIONS

The present application is a continuation application of PCT Application No. PCT/CN2018/118493, filed Nov. 30, 2018, which claims priority to Chinese Patent Application No. 201810703674.6, filed Jun. 30, 2018. Both applications are incorporated by reference herein for all purposes.

TECHNICAL FIELD

The present application relates to the field of display technology.

BACKGROUND

Touch-control panels, due to their convenient ways to use, are more and more applied in the field of display technology, such as being applied in tourist navigation systems, automatic teller machines, portable electronic products and industrial control systems. The material of touch-control electrodes in conventional touch-control panels is usually indium tin oxide (ITO), however, the conventional ITO film is limited by problems of its own brittleness, electrical conductivity and light transmittance from being developed towards flexibility. Currently, the industry has been trying to develop alternative materials instead of ITO films, wherein, metal nanowires have excellent mechanical properties, especially, silver nanowires have the good electrical conductivity of silver, and in the meantime, because of the nanometer level size effect thereof, the metal nanowires have excellent light transmittance and bending resistance, therefore, they can be used to replace ITO films as material for touch-control electrodes.

SUMMARY

A technical problem to be solved by the present application is to provide a touch-control panel, a manufacturing method thereof and a display device with reduced electrical resistance of the touch-control panel, improved touch-control effects of the touch-control panel, as well as improved reliability of the display device comprising the touch-control panel.

In order to solve the above technical problem and its related problems, the embodiments of the present application provide a touch-control panel, comprising:

a flexible substrate;

a touch-control electrode layer disposed on the flexible substrate, the touch-control electrode layer comprising a nanometal pattern and a wiring pattern contacting with each other to establish an electric connection therebetween; and a conductive layer, disposed on the touch-control electrode layer and at least partially covering a contact region of the wiring pattern in contact with the nanometal pattern.

Furthermore, in the touch-control panel, the conductive layer is made of material comprising indium tin oxide.

Optionally, in the touch-control panel, the conductive layer, along a direction extending from the wiring pattern to the nanometal pattern, has a coverage width of 5 μm-20 μm.

Furthermore, in the touch-control panel, the conductive layer, along a direction extending from the wiring pattern to the nanometal pattern, has a coverage width of 10 μm-15 μm.

Optionally, in the touch-control panel, along a direction extending from the wiring pattern to the nanometal pattern, the conductive layer has a width covering upon the wiring pattern equal to that of the conductive layer covering upon the nanometal pattern.

Furthermore, in the touch-control panel, the touch-control panel also comprises a protective layer covering an exposed portion of the nanometal pattern.

Optionally, in the touch-control panel, the protective layer has a thickness equal to that of the conductive layer.

Optionally, in the touch-control panel, the nanometal pattern comprises a silver nanowire pattern, and the wiring pattern includes a silver wire pattern.

Optionally, in the touch-control panel, silver nanowires in the silver nanowire pattern have a length of 10 μm-300 μm and a diameter less than 500 nm, and a ratio of the length of the silver nanowire to the diameter of the silver nanowire is larger than 10.

Optionally, the wiring pattern corresponds to a bezel zone of the touch-control panel.

Optionally, the bezel zone of the touch-control panel has a left bezel zone and a right bezel zone, and the wiring pattern is located on opposite lateral sides of the nanometal pattern.

Optionally, the touch-control panel has four bezel zones that form an annular shape, and the wiring pattern is arranged to surround the nanometal pattern.

According to another aspect of the present application, the embodiments of the present application also provide a display device which comprises the aforementioned touch-control panel.

According to yet another aspect of the present application, the embodiments of the present application also provide a method for manufacturing a touch-control panel, comprising:

providing a flexible substrate;

forming a touch-control electrode layer on the flexible substrate; and forming a conductive layer on the touch-control electrode layer;

wherein, the touch-control electrode layer comprises a nanometal pattern and a wiring pattern contacting with each other to establish an electric connection, and the touch-control electrode layer at least partially covers a contact region of the wiring pattern in contact with the nanometal pattern.

Furthermore, in the method for manufacturing the touch-control panel, the step of forming the conductive layer comprises coating to form the conductive layer.

Furthermore, the manufacturing method also comprises forming a protective layer on a portion of the nanometal pattern uncovered by the conductive layer.

Furthermore, in the method for manufacturing the touch-control panel, the step of forming the touch-control electrode layer comprises:

coating a nanometal layer on a first area of the flexible substrate;

laser-etching the nanometal layer to form the nanometal pattern;

forming a conductive slurry on a second area of the flexible substrate;

laser-etching the conductive slurry to form the wiring pattern.

Furthermore, in the method for manufacturing the touch-control panel, the step of forming the touch-control electrode layer comprises:

coating a nanometal layer on a first area of the flexible substrate;

forming a conductive slurry on a second area of the flexible substrate;

laser-etching the nanometal layer and the conductive slurry simultaneously to form the nanometal pattern and the wiring pattern.

Furthermore, in the method for manufacturing the touch-control panel, the second area corresponds to a bezel zone of the touch-control panel.

In comparison with prior art, the present application has the following beneficial effects:

The touch-control panel of the present application comprises a flexible substrate, a touch-control electrode layer and a conductive layer, wherein the touch-control electrode layer comprises a nanometal pattern and a wiring pattern contacting with each other to establish an electric connection, and the conductive layer at least partially covers a contact region of the wiring pattern in contact with the nanometal pattern. Because there is a conductive layer covering the contact region of the wiring pattern in contact with the nanometal pattern, the conductive layer can enlarge the effective contacting area of the wiring pattern in contact with the nanometal pattern, so as to reduce the electrical resistance of the touch-control panel, enhance its touch-control effects, and improve the reliability of the display device comprising the touch-control panel.

Furthermore, the touch-control panel also comprises a protective layer covering an exposed portion of the nanometal pattern. The protective layer may increase the bonding strength between the nanometal pattern and the flexible substrate, but would not shield the portion of the nanometal pattern at its contact region with the wiring pattern, thereby further being beneficial for the stabilization of the electrical resistance of the touch-control panel and the enhancement of the touch-control effects of the touch-control panel.

Furthermore, the conductive layer is made of material comprising indium tin oxide. Because indium tin oxide has good adhesion force, light transmittance, electrical conductivity and anti-ultraviolet capability, the indium tin oxide not only can effectively enlarge the effective contacting area between the wiring pattern and the nanometal pattern, but also can have functions of anti-ultraviolet effect and enhancing the adhesion force of the nanometal pattern, thereby further improving the touch-control effects of the touch-control panel as well as the reliability of the display device comprising the touch-control panel.

DETAILED DESCRIPTION OF THE INVENTION

Figure 1:
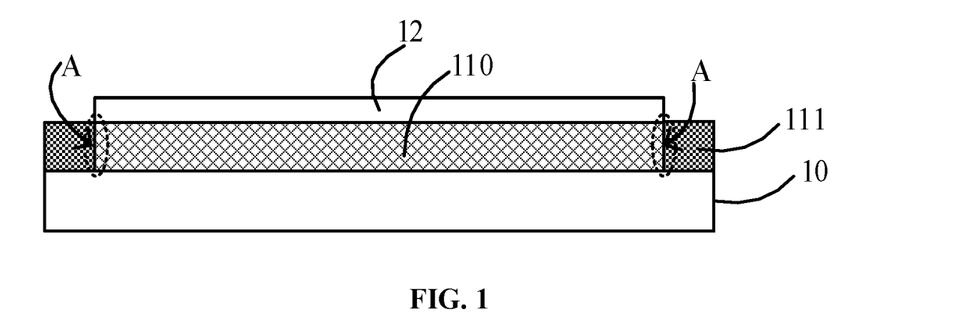
FIG. 1 is a structural schematic view of a touch-control panel.

The existing touch-control panels still have problems of high electrical resistance and poor touch-control effects. FIG. 1 is a structural schematic view of a touch-control panel having silver nanowires. As shown in FIG. 1, a touch-control panel having silver nanowires comprises a substrate 10 and a touch-control electrode layer formed on the substrate 10. The touch-control electrode layer comprises a silver nanowire pattern 110 (serving as touch-control electrodes of the touch-control panel) and a wiring pattern 111 (serving as interconnecting wires for the touch-control electrodes of the touch-control panel). The wiring pattern 111 and the silver nanowire pattern 110 are in contact with each other to establish an electric connection. One option, the wiring pattern 111 is located on the periphery of the silver nanowire pattern 110 (i.e., the wiring pattern 111 is usually located at a bezel zone of the touch-control panel), for example, the wiring pattern 111 is located on two opposite sides of the silver nanowire pattern 110. Thus, the silver nanowire pattern 110 is only lap joint with the substrate 10 by a weak intermolecular force, with a poor bonding strength between the silver nanowire pattern 110 and the substrate 10. It is easy to slip in a process of bending, which causes a phenomenon of high electrical resistance and unstable electrical resistance of the touch-control panel.

Hence, continuing to refer to FIG. 1, an Over Coating (abbreviated as OC) layer 12 is coated on the silver nanowire pattern 110 of the above-mentioned touch-control panel, for enhancing the bonding strength between the silver nanowire pattern 110 and the substrate 10. Usually, the OC layer 12 is an insulating protection adhesive layer. The coated OC layer 12 may enhance the adhesion force of the silver nanowire pattern 110 to prevent a slipping phenomenon in a process of bending. The OC layer 12 would shield a part of the silver nanowires, and especially would shield the silver nanowires at the contact region A (the location A shown by the dashed line circle in FIG. 1) between the silver nanowire pattern 110 and the wiring pattern 111. Therefore, the coating of the OC layer 12 correspondingly reduces the effective contacting area between the silver nanowires and the wiring pattern 111, which increases the electrical resistance of the touch-control panel and adversely affects the touch-control effects of the touch-control panel.

Based on the discovery above, the embodiments of the present application provide a touch-control panel which comprises a flexible substrate; a touch-control electrode layer, comprising a nanometal pattern and a wiring pattern in contact with each other to realize electric connection and disposed on the flexible substrate; and a conductive layer, disposed on the touch-control electrode layer and at least partially covering a contact region between the wiring pattern and the nanometal pattern. Because there is a conductive layer covering the contact region between the wiring pattern and the nanometal pattern, the conductive layer can enlarge the effective contacting area between the wiring pattern and the nanometal pattern, so as to reduce the electrical resistance of the touch-control panel, enhance its touch-control effects, and improve the reliability of the display device comprising the touch-control panel.

Figure 2:
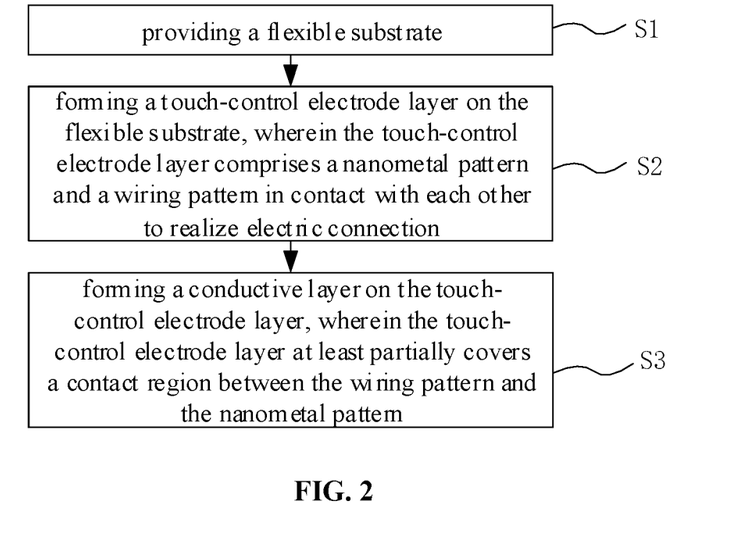
FIG. 2 is a flow chart of a method for manufacturing a touch-control panel provided by the embodiments of the present application.

Meanwhile, the embodiments of the present application also provide a method for manufacturing a touch-control panel, as shown in FIG. 2, the method for manufacturing the touch-control panel according to the present application comprises:

Step S1, providing a flexible substrate;

Step S2, forming a touch-control electrode layer on the flexible substrate, wherein the touch-control electrode layer comprises a nanometal pattern and a wiring pattern in contact with each other to establish an electric connection; and Step S3, forming a conductive layer on the touch-control electrode layer, wherein the touch-control electrode layer at least partially covers a contact region of the wiring pattern in contact with the nanometal pattern.

Because, after the touch-control electrode layer is formed, a conductive layer is formed to cover the contact region between the wiring pattern and the nanometal pattern, the conductive layer can enlarge the effective contacting area between the wiring pattern and the nanometal pattern, so as to reduce the electrical resistance of the touch-control panel, enhance its touch-control effects, and improve the reliability of the display device comprising the touch-control panel.

Hereinafter, with reference to the flow chart and schematic views, more detailed description of the touch-control panel, the manufacturing method thereof and the display device according to the present application will be given, wherein preferable embodiments of the present application are illustrated, and it should be understood that a person skilled in the art may modify the present application described herein but still can realize the beneficial effects of the present application. Therefore, the description below should be understood as a general know-how to a person skilled in the art, and should not be construed as limitation to the present application.

In the following paragraphs, the present application is described in more detail by examples with reference to the appended drawings. According to the description below, the advantages and characteristics of the present application would be clearer. It should be noted that, the appended drawings are all in a very simplified form with non-accurate scale, and are only for the purpose of conveniently and clearly assisting the description of the embodiments of the present application.

Referring to FIG. 2 to FIG. 6, wherein FIG. 2 shows a flow chart of a method for manufacturing the touch-control panel in the embodiments of the present application, FIG. 3 to FIG. 6 show structural schematic views corresponding to the respective steps in the method for manufacturing the touch-control panel in the embodiments of the present application.

Figure 3:
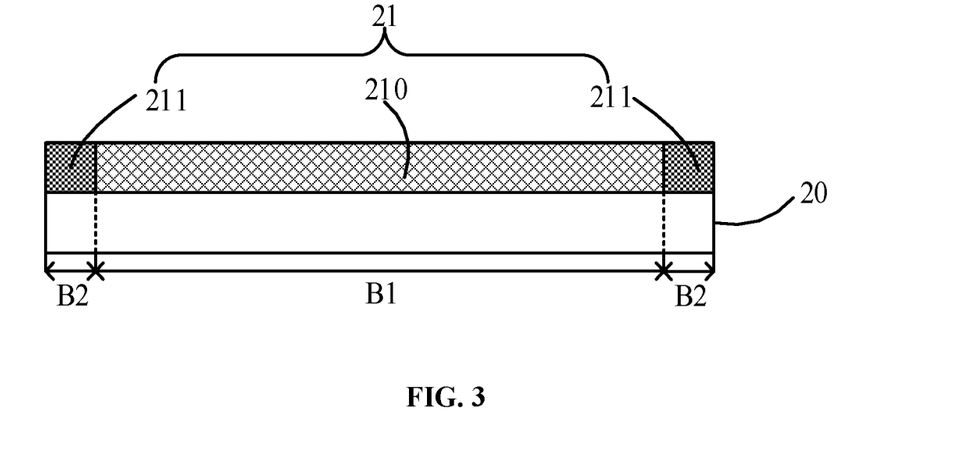
FIG. 3 to FIG. 6 are structural schematic views corresponding to the respective steps of the method for manufacturing the touch-control panel in the embodiments of the present application.

Firstly, the Step S1 is performed by providing a flexible substrate 20, as shown in FIG. 3. In an actual industrial process, because of the flexibility of the flexible substrate 20, the flexible substrate 20 is coated on a rigid base, which provides support for the subsequent manufacturing process steps. The rigid base may be, but is not limited to, regular glass. Preferably, the material of the flexible substrate 20 may be, but is not limited to, acryl, polymethyl methacrylate (PMMA), polyacrylonitrile butadiene styrene (ABS), polyamide (PA), polyimide (PI), polybenzimidazole polybutene (PB), polybutylene terephthalate (PBT), polycarbonate (PC), polyether ether ketone (PEEK), polyether imide (PEI), polyether sulfone (PES), polyethylene (PE), polyethylene terephthalate (PET), polyethylene tetrafluoroethylene (ETFE), poly-epoxyethane, polyethylene glycolic acid (PGA), poly-methyl-pentene (PMP), polyformaldehyde (POM), polyphenylene ether (PPE), polypropylene (PP), polystyrene (PS), polytetrafluoroethylene (PTFE), polyurethane (PU), polyvinyl chloride (PVC), polyvinyl fluoride (PVF), polyvinylidene chloride (PVDC), polyvinylidene fluoride (PVDF) or styrene-acrylonitrile (SAN). Preferably, in the present embodiment, the material of the flexible substrate 20 is polyimide. Furthermore, in the present embodiment, the flexible substrate 20 is defined to include a first area B1 and a second area B2 on both lateral sides of the first area B1. Wherein, the second area B2 corresponds to the position of a bezel of the touch-control panel (i.e., in the present embodiment, the bezel of the touch-control panel includes a left bezel zone and a right bezel zone). Apparently, in other embodiments, the second area B2 may also be surrounding the first area B1 (i.e., the bezel of the touch-control panel includes four bezel zones that form an annular shape).

Subsequently, the Step S2 is performed by forming a touch-control electrode layer 21 on the flexible substrate 20. The touch-control electrode layer 21 comprises a nanometal pattern and a wiring pattern in contact with each other to establish an electrical connection, as shown in FIG. 3. The nanometal pattern may be, but is not limited to, a gold nanowire pattern or a silver nanowire pattern. In the present embodiment, because silver is a slivery-white metal in normal state and is an opaque material with excellent electrical conductivity, the nanometal pattern is preferably a silver nanowire pattern 210. Silver nanowires in the silver nanowire pattern 210 may have a length of 10 μm to 300 μm and a diameter (or width) less than 500 nm. The silver nanowires may have a ratio of a length to a diameter thereof (i.e., a ratio of the length to the width) larger than 10. The wiring pattern may be, but is not limited to, a silver wire pattern 211.

Specifically, the step of forming the touch-control electrode layer 21 comprises: firstly, coating a silver nanowire layer on the first area B1 of the flexible substrate 20. The coating method includes but not limited to: inkjet, spreading, gravure printing, embossed printing, flexographic printing, nano-imprinting, screen printing, scraper coating, spin coating, stylus plotting, seam coating or flow coating; then, performing laser-etching to form the required silver nanowire pattern 210 (i.e., the silver nanowire pattern 210 is formed in the first area B1), the silver nanowire pattern 210 serves as touch-control electrodes of the touch-control panel; subsequently, forming a conductive silver slurry on the second area B2 of the flexible substrate 20; and likewise, performing laser-etching to form the required silver wire pattern 211 (i.e., the silver wire pattern 211 is formed in the second area B2), the silver wire pattern 211 serves as interconnecting wires for the touch-control electrodes. Furthermore, as mentioned above, the second area B2 corresponds to the position of a bezel of the touch-control panel, i.e., the formed silver wire pattern 211 corresponds to a bezel zone of the touch-control panel. Therefore, when the bezel of the touch-control panel includes a left bezel zone and a right bezel zone, the silver wire pattern 211 is located on opposite lateral sides of the silver nanowire pattern 210. When the bezel of the touch-control panel includes four bezel zones that form an annular shape, the silver wire pattern 211 is arranged to surround the silver nanowire pattern 210.

Optionally, the step of forming the touch-control electrode layer 21 may also comprise: coating a silver nanowire layer on the first area B1 of the flexible substrate 20, and forming a conductive silver slurry on the second area B2 of the flexible substrate 20; then, laser-etching the silver nanowire layer and the conductive silver slurry simultaneously to form the required silver nanowire pattern 210 and silver wire pattern 211. Apparently, the touch-control electrode layer 21 may also be formed by other steps. The specific steps of forming the touch-control electrode layer are not limited herein.

Hence, the silver wires in the silver wire pattern 211 are in lap joint with the silver nanowires in the silver nanowire pattern 210 to establish an electric connection. Subsequently, the Step S3 is performed by forming a conductive layer on the touch-control electrode layer. The touch-control electrode layer at least partially covers a contact region of the wiring pattern in contact with the nanometal pattern. The conductive layer is used to enlarge the effective contacting area at the contact region of the wiring pattern in contact with the nanometal pattern (i.e., increasing the effective contact between the silver wires and the silver nanowires). Furthermore, because an ITO film is a transparent conductive film having good adhesion force, light transmittance and anti-ultraviolet capability, hence, the conductive layer in the present embodiment is preferably an ITO layer 22.

Figure 4:
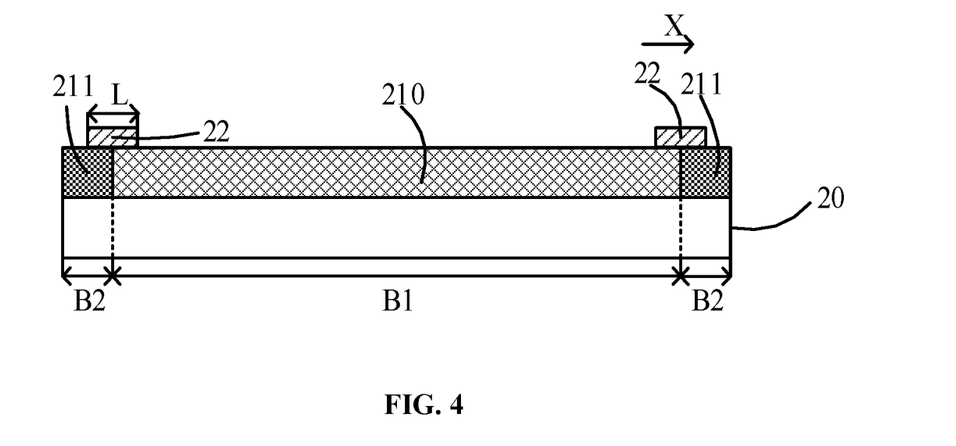
Figure 5:
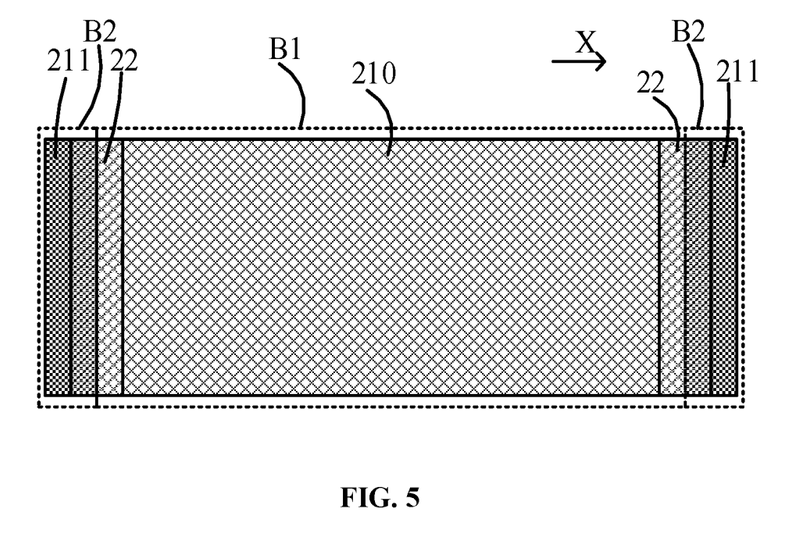

Specifically, after the Step S2 is performed, an ITO film is coated on the touch-control electrode layer 21, and by a patterning process, only the ITO layer 22 upon the contact region of the silver wire pattern 211 in contact with the silver nanowire pattern 210 is preserved, as shown in FIG. 4 and FIG. 5, wherein FIG. 5 is a top structural schematic view corresponding to FIG. 4. Preferably, in a direction extending from the silver wire pattern 211 to the silver nanowire pattern 210 (the X direction shown in FIG. 4 or FIG. 5), the ITO layer 22 has a coverage width (line width) L of 5 μm to 20 μm. Further preferably, the line width L of the ITO layer 22 may be 10 μm to 15 μm. Also, the line widths L of the portions of the ITO layer 22 on the left side and on the right side may be equal, or may be unequal. In other embodiments, when the bezel includes four bezel zones, the line width L of the ITO layer 22 can refer to the widths at the left and right bezel zones in the X direction as shown in FIG. 5, or can refer to the widths at the top and bottom bezel zones in a direction perpendicular to the X direction. The thickness of the ITO layer 22 may be several micrometers to several tens of micrometers. Also, the shape of the ITO layer 22 is not limited herein, the ITO layer 22 may cover a part of the contact region, or may cover all of the contact region, and as long as the condition that the ITO layer 22 partially covers or fully covers the region where the silver wires in the silver wire pattern 211 are in lap joint with the silver nanowires in the silver nanowire pattern 210 is fulfilled, the purpose of enlarging the effective contacting area between the silver wires and the silver nanowires can be realized. Therefore, the ITO layer 22 not only can enlarge the contacting area of the silver wires in contact with the silver nanowires, but also has a function of enhancing the adhesion force of the silver nanowire pattern 210 therebeneath, thereby improving the reliability of the display device comprising the touch-control panel.

Figure 6:
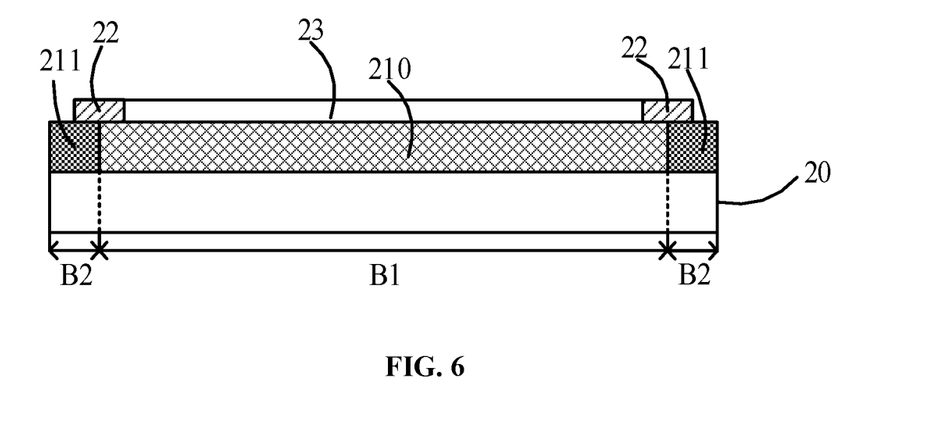

Preferably, the method for manufacturing the touch-control panel also comprises forming a protective layer 23 on an exposed portion of the silver nanowire pattern 210, as shown in FIG. 6. The protective layer 23 is used to further enhance the bonding strength of the silver nanowire pattern 210 in other areas bonded to the flexible substrate 20, as well as being used to protect the silver nanowire pattern 210 in other areas. Preferably, the protective layer 23 is an insulating adhesive layer. Preferably, the protective layer 23 has a thickness equal to that of the ITO layer 22, so that the protective layer 23 would not shield the portion of the nanometal pattern at its contact region with the wiring pattern, thereby further being beneficial for the stabilization of the electrical resistance of the touch-control panel.

Therefore, in the method for manufacturing the touch-control panel of this embodiment, after the touch-control electrode layer 21 is formed, an ITO layer 22 is formed to cover the contact region of the silver wire pattern 211 in contact with the silver nanowire pattern 210. An effective contacting area of the silver wires in the silver wire pattern 211 in contact with the silver nanowires in the silver nanowire pattern 210 can be enlarged, so the electrical resistance of the touch-control panel can be reduced, and the touch-control effects of the touch-control panel can be improved. The ITO layer 22 also has a function of enhancing the adhesion force of the silver nanowire pattern 210 therebeneath, thereby improving the reliability of the display device comprising the touch-control panel.

Furthermore, the embodiments of the present application provide a touch-control panel which comprises a flexible substrate 20, a touch-control electrode layer 21, an ITO layer 22 and a protective layer 23. The touch-control electrode layer 21 is disposed on the flexible substrate 20 and comprises a silver nanowire pattern 210 and a silver wire pattern 211 in contact with each other to establish an electric connection. The ITO layer 22 is disposed on the touch-control electrode layer 21 and at least partially covering a contact region of the silver wire pattern 211 in contact with the silver nanowire pattern 210. The protective layer 23 covers a portion of the silver nanowire pattern 210 not covered by the conductive layer. Because there is an ITO layer 22 covering the contact region of the silver wire pattern 211 in contact with the silver nanowire pattern 210, it can enlarge the effective contacting area of the silver wire pattern 211 in contact with the silver nanowire pattern 210, so as to reduce the electrical resistance of the touch-control panel, enhance the touch-control effects, and improve the reliability of the display device comprising the touch-control panel. Apparently, the touch-control panel is not limited to being formed by the aforementioned manufacturing method.

The touch-control panel provided by the embodiments of the present application comprises a flexible substrate, a touch-control electrode layer and a conductive layer. The touch-control electrode layer comprises a nanometal pattern and a wiring pattern in contact with each other to establish an electric connection. The conductive layer at least partially covers a contact region of the wiring pattern in contact with the nanometal pattern. Because there is a conductive layer covering the contact region between the wiring pattern and the nanometal pattern, the effective contacting area of the wiring pattern in contact with the nanometal pattern can be enlarged, so the electrical resistance of the touch-control panel is reduced, and the touch-control effects are enhanced, and the reliability of the display device comprising the touch-control panel is improved.

Furthermore, the touch-control panel also comprises a protective layer covering an exposed portion of the nanometal pattern. The protective layer may increase the bonding strength between the nanometal pattern and the flexible substrate, but would not shield the portion of the nanometal pattern at the contact region with the wiring pattern, thereby further being beneficial for the stabilization of the electrical resistance of the touch-control panel and the enhancement of the touch-control effects of the touch-control panel.

Furthermore, the conductive layer is made of material comprising indium tin oxide. Because indium tin oxide has good adhesion force, light transmittance, electrical conductivity and anti-ultraviolet capability, the indium tin oxide not only can effectively enlarge the effective contacting area between the wiring pattern and the nanometal pattern, but also has an anti-ultraviolet function and can enhance the adhesion force of the nanometal pattern, thereby further improving the touch-control effects of the touch-control panel as well as the reliability of the display device.

Apparently, a person skilled in the art may make various changes and modifications to the present application without departing from the concept and scope of the present application. Thus, if these changes and modifications belong to the scope of the Claims of the present application and equivalent technology thereof, the present application is also intended to include these changes and modifications.

The invention claimed is:

1. A touch-control panel, comprising:
    a flexible substrate having a surface, the surface including:
        a display area; and
        at least one peripheral area adjacent the display area;
    a touch-control electrode layer disposed on the surface of the flexible substrate, the touch-control electrode layer comprising:
    a nanometal pattern coupled to the display area of the surface of the flexible substrate; and
    a wiring pattern coupled to the at least one peripheral area of the surface of the flexible substrate, the wiring pattern contacting with the nanometal pattern in a contact region to establish an electric connection therebetween; and
    a conductive layer disposed on the touch-control electrode layer, the conductive layer at least partially covering the contact region and extending partially into the display area and partially into the at least one peripheral area.

2. The touch-control panel according to claim 1, wherein, the conductive layer is made of material comprising indium tin oxide.

3. The touch-control panel according to claim 1, wherein, the conductive layer, along a direction extending from the wiring pattern to the nanometal pattern, has a coverage width of 5 µm-20 µm.

4. The touch-control panel according to claim 3, wherein, the conductive layer, along a direction extending from the wiring pattern to the nanometal pattern, has a coverage width of 10 µm-15 µm.

5. The touch-control panel according to claim 3, wherein, along a direction extending from the wiring pattern to the nanometal pattern, the conductive layer has a width covering upon the wiring pattern equal to that of the conductive layer covering upon the nanometal pattern.

6. The touch-control panel according to claim 1, further comprising a protective layer covering an exposed portion of the nanometal pattern.

7. The touch-control panel according to claim 6, wherein, the protective layer has a thickness equal to that of the conductive layer.

8. The touch-control panel according to claim 1, wherein, the nanometal pattern comprises a silver nanowire pattern, and the wiring pattern includes a silver wire pattern.

9. The touch-control panel according to claim 8, wherein, silver nanowires in the silver nanowire pattern have a length of 10 µm-300 µm and a diameter less than 500 nm, and a ratio of the length of the silver nanowire to the diameter of the silver nanowire is larger than 10.

10. The touch-control panel according to claim 1, wherein, the wiring pattern corresponds to a bezel zone of the touch-control panel.

11. The touch-control panel according to claim 10, wherein, the bezel zone of the touch-control panel has a left bezel zone and a right bezel zone, and the wiring pattern is located on opposite lateral sides of the nanometal pattern.

12. The touch-control panel according to claim 10, wherein, the touch-control panel has four bezel zones that form an annular shape, and the wiring pattern is arranged to surround the nanometal pattern.

13. A display device, comprising a touch-control panel according to claim 1.

14. A method for manufacturing a touch-control panel, comprising:
    providing a flexible substrate having a surface, the surface including:
        a display area; and
        at least one peripheral area adjacent the display area;
    forming a touch-control electrode layer on the surface of the flexible substrate, the touch-control electrode layer comprising:
        a nanometal pattern coupled to the display area of the surface of the flexible substrate; and
        a wiring pattern coupled to the at least one peripheral area of the surface of the flexible substrate, the wiring pattern contacting with the nanometal pattern in a contact region to establish an electric connection therebetween; and
    forming a conductive layer on the touch-control electrode layer, the conductive layer at least partially covering the contact region and extending partially into the display area and partially into the at least one peripheral area.

15. The method according to claim 14, wherein, the step of forming the conductive layer comprises coating to form the conductive layer.

16. The method according to claim 14, wherein, further comprising forming a protective layer on a portion of the nanometal pattern uncovered by the conductive layer.

17. The method according to claim 14, wherein, the step of forming the touch-control electrode layer comprises:
    coating a nanometal layer on the display area of the flexible substrate;
    laser-etching the nanometal layer to form the nanometal pattern;
    forming a conductive slurry on the at least one peripheral area of the flexible substrate;
    laser-etching the conductive slurry to form the wiring pattern.

18. The method according to claim 14, wherein, the step of forming the touch-control electrode layer comprises:
    coating a nanometal layer on the display area of the flexible substrate;
    forming a conductive slurry on the at least one peripheral area of the flexible substrate;
    laser-etching the nanometal layer and the conductive slurry simultaneously to form the nanometal pattern and the wiring pattern.

19. The method according to claim 17, wherein, the at least one peripheral area corresponds to a bezel zone of the touch-control panel.

* * * * *